Oct. 5, 1965   A. FEHRMANN   3,209,805
LOCK NUT
Filed July 15, 1964

United States Patent Office 3,209,805
Patented Oct. 5, 1965

3,209,805
LOCK NUT
Adolph Fehrmann, Flemingstrasse 12,
Hamburg, Germany
Filed July 15, 1964, Ser. No. 382,819
Claims priority, application Germany, Dec. 22, 1960,
F 32,821
6 Claims. (Cl. 151—30)

This application is a continuation-in-part of application Serial No. 159,348, filed December 14, 1961, and which is now abandoned.

The present invention relates to improvements in lock nuts.

The lock nut of the invention more particularly is one made of a piece of sheet metal comprising an annular base portion whose inner edge is provided with inwardly extending relatively wide locking flaps which alternate with relatively narrow pointed locking teeth for engaging the thread of a bolt, said piece of sheet metal having on its outer periphery a sleeve-like flange which is bent into the shape of a number of plane side walls which form a multi-sided nut, such as a hexagonal nut.

It is an object of the invention to provide a lock nut which is adapted to be screwed against a conventional nut already screwed home on a bolt in its holding position, for which purpose the lock nut of the invention is screwed onto the bolt until its annular base portion engages the outer end face of said conventional nut previously screwed onto the bolt.

The lock nut of the invention for the purpose stated is provided with means which exert a locking action in radial direction and in axial direction. These means comprise circumferentially arranged alternate locking flaps and locking teeth which engage the same turn of the helical groove forming the screw thread.

According to a very important object of the invention, the locking nut is provided with circumferentially arranged yieldable radial locking flaps which are relatively wide, and circumferentially spaced yieldable radial locking teeth which are relatively narrow and have each a projecting pointed corner. These locking flaps and locking teeth alternate circumferentially and are all bent angularly with respect to the annular base portion of the nut toward the same side of the annular base portion. All locking flaps and locking teeth are pitched so as to conform to the pitch of the screw thread for which the lock nut is intended. Furthermore, all locking flaps and locking teeth engage the same turn of the helical groove forming the screw thread. When the lock nut is applied to a screw bolt, the wide locking flaps will yieldably engage the root portion of the helical groove and effect a locking in radial direction. The locking teeth, however, do not only engage yieldingly the root portion of the helical groove forming the screw thread, but also engage yieldingly the flank of the helical rib forming the thread and thereby perform a holding effect in axial direction.

Each locking tooth is provided with one projecting pointed corner which in the tightening direction of the nut falls behind the other corner of the locking tooth and this has the result that the pointed corner not only engages yieldingly the root of the helical groove of the thread to thereby perform an additional radial holding effect, but upon rotation of the lock nut in releasing direction this pointed corner engages point by point into the root of the helical groove of the thread and produces depressions, particularly when the bolt is subjected to vibrations, so that the depressions serve as a resistance against a loosening of the lock nut.

With these and other objects in view the invention will now be described in greater detail with reference to the accompanying drawings which illustrate several embodiments of the invention.

Figure 1:
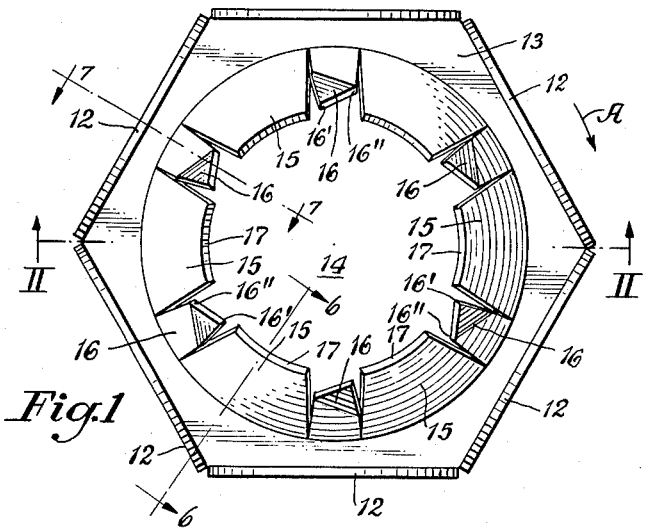
FIG. 1 is a plan view of a lock nut of the invention.
Figure 6:
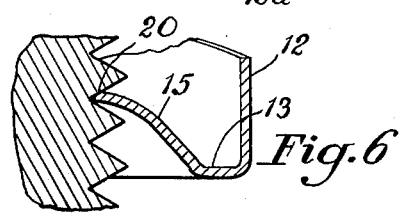
Figure 7:
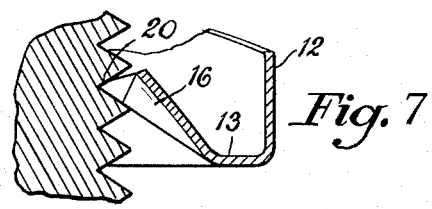

FIG. 6 is a fragmentary sectional view taken on oblique line 6—6 of FIGURE 1 looking in the direction of the arrows and showing a locking flap and the manner it engages the thread on a bolt, and FIG. 7 is a fragmentary sectional view taken on oblique line 7—7 of FIGURE 1 looking in the direction of the arrows and showing a locking tooth and the manner it engages the flank of the helical rib of a right handed thread on a bolt.

Figure 2:
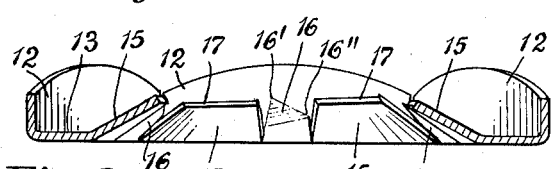
FIG. 2 is a sectional view along the line II—II of FIG. 1.

Referring to the FIGS. 1 and 2 of the drawings, the lock nut comprises a piece of sheet metal provided on its outer periphery with a sleeve-like flange forming a number of flat side walls 12 which constitute the perimeter of a nut, which in the present instance is a hexagonal nut. The base or center portion 13 of the piece of sheet metal is provided with an aperture 14 for the screw bolt. From the edge of this aperture extend a number of circumferentially spaced yieldable radial locking flaps 15 which are directed inwardly. These flaps are relatively wide in circumferential direction and are all bent angularly outwardly from the plane of the angular base portion 13 of the nut toward one side thereof. The outermost edges 17 of these locking flaps 15 extend concentrically to the axis of the nut, or in other words, also concentrically to the circumference of the screw bolt, and are twisted and have edges defining a helix such a pitch whereby all flaps yieldingly engage the root of the same turn of the helical groove 20 forming the screw thread. Upon continuous rotation of the lock nut the locking flaps 15 tend to flatten out radially and are forced with increased pressure into the root of the helical groove as shown in FIGURE 6. Therefore, the locking flaps 15 provide an effective locking action in radial direction of the bolt as shown diagrammatically in FIG. 6.

Figure 5:
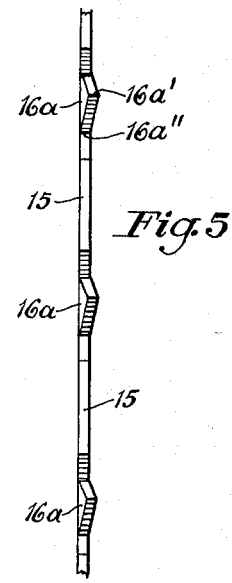
FIG. 5 is a development edge view of the locking flaps and locking teeth in the form of the invention shown in FIGURES 1 and 2.

Between each two of these relatively wide locking flaps 15 are arranged circumferentially spaced, relatively narrow yieldable locking teeth 16 which are also all bent angularly outwardly from the annular base portion 13 of the nut and all are bent in the same direction as the wider locking flaps 15 and engage the same turn of the helical groove as the locking flaps 15. The locking teeth 16 are provided, however, at their innermost free ends with pointed projecting corners 16' which with respect to the tightening direction A of the lock nut fall behind the other corner 16". This corner 16" is so to speak cut away at an angle and is spaced a shorter radial distance away from the base of the tooth 16 than the adjacent outer edge of the locking flap 15. The corners or points 16' are slightly bent or offset to one side of the edges 17 of the flaps 15 as shown in FIGURE 5. The corners 16' of the teeth 16 engage one flank of the profile of the screw thread as diagrammatically shown in FIG. 7 and exert an axially directed locking action.

Figure 3:
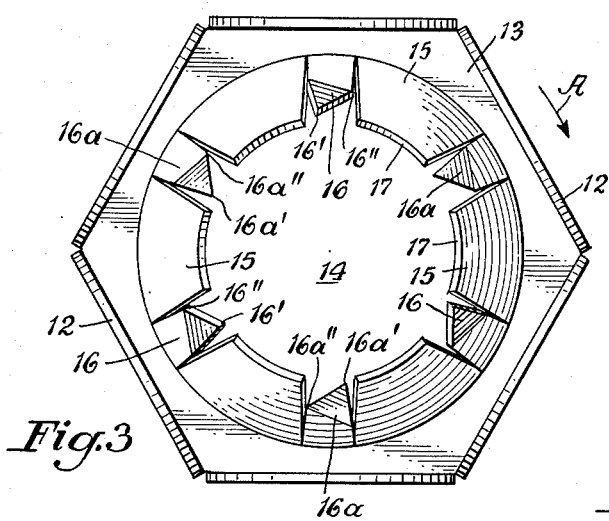
FIG. 3 is a plan view of a modified construction of the lock nut.
Figure 4:
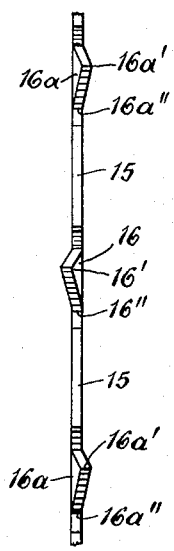
FIG. 4 is a partial view in development showing the arrangement of the outermost edges of the locking flaps and locking teeth of FIG. 3.

In the FIGS. 3 and 4 a modified construction of the lock nut of the invention is illustrated in that the projecting pointed corners 16a' of the locking teeth 16a, which in the tightening direction A fall behind the other corners 16a″, are alternately bent into opposite directions from the body portions of the locking teeth 16a in order to engage more securely both flanks of the same helical groove forming the threads of the bolt. The oppositely bent pointed corners 16a′ of the locking teeth 16a are particularly clearly illustrated in FIG. 4. If desired, the pointed corners 16a′ may also be bent all in the same direction with respect to the body of the locking teeth 16a, as shown in FIG. 5.

In FIGURE 7 the flaps 15 are illustrated as engaging the root 20 of the bolt. However, when the nut 12 is tightened in place, the edge portion 17 of the flaps will be forced into engagement with the flanks of the threads on the bolt. Similarly, as shown in FIGURE 8 the points 16′ of the pointed member 16 will be flexed when the nut is tightened in place to engage the flank of the bolt and the points 16′ will be urged into registry with the helical curve of the edges 17 with the pointed portions engaging the bolt thread root and the edges contacting the flank portions.

What I claim is:

1. A lock nut made of sheet metal comprising
   (a) a plane body portion forming an annular flat base,
   (b) a series of yieldable radial locking flaps extending inwardly from said annular base portion and adapted to engage the root portion of the helical groove forming the thread on a screw bolt, and
   (c) a series of yieldable radial locking teeth extending inwardly from said annular base portion,
   (d) said locking teeth being substantially narrower than said locking flaps and being provided each with a projecting pointed corner at their innermost end,
   (e) said projecting pointed corners in the direction of rotation in which said nut is tightened follow behind the other corners of said locking teeth which project not as far as said projecting pointed corners from said annular base portion and are positioned at longer radii points relative to the first mentioned projecting pointed corners,
   (f) said locking flaps and locking teeth being arranged alternately circumferentially and being all angularly inclined in the same direction with respect to the plane of said base portion with each of said flaps having outer inclined edges to define a helix to engage the same turn of the helical groove forming the thread on the bolt,
   (g) said locking teeth being shaped to engage a flank of the helical rib formed by said helical groove while said projecting pointed corners on said locking teeth engage the root of said helical groove, said bent pointed end corners being radially closer to the axis and axially displaced from the helix defined by the edges of said flaps, 2. A lock nut according to claim 1, in which said locking teeth are somewhat twisted about axes extending radially of the nut.

3. A lock nut made of sheet metal comprising
   (a) a plane body portion forming an annular flat base provided with laterally bent flat side walls on its circumference to form a multisided nut,
   (b) a series of yieldable radial locking flaps extending inwardly from said annular base portion and having circumferentially extending outer edges which extend concentrically about the axis of the nut and are adapted to engage the root portion of the helical groove forming the thread on a screw bolt, and
   (c) a series of yieldable radial locking teeth extending inwardly from said annular base portion,
   (d) said locking teeth being substantially narrower than said locking flaps and being provided each with a projecting corner at their innermost end,
   (e) said projecting corners in the direction of rotation in which said nut is tightened follow behind the other corners of said locking teeth which project not as far as said projecting corners from said annular base portion and are positioned at longer radii points relative to the projecting corners,
   (f) said locking flaps and locking teeth being arranged alternately circumferentially and being all angularly inclined in the same direction with respect to the plane of said plane body base portion and being inclined to define a helix so as to be able to engage the same turn of the helical groove forming the thread on the bolt,
   (g) said locking teeth being shaped to engage a flank of the helical rib formed by said helical groove while said projecting corners on said locking teeth engage the root of said helical groove, said bent end corners being radially closer to the axis of said nut and axially displaced from the helix defined by said flap edges.

4. A lock nut according to claim 3, in which said projecting corners on said locking teeth are pointed and are angularly bent with respect to the plane of the body of said locking teeth.

5. A lock nut according to claim 3, in which said projecting corners on said locking teeth are pointed and are angularly bent with respect to the plane of the body of said locking teeth toward only one side thereof.

6. A lock nut according to claim 3, in which said projecting corners on said locking teeth are pointed and are angularly bent with respect to the plane of the body of said locking teeth alternately to opposite sides thereof.

References Cited by the Examiner

UNITED STATES PATENTS

| 861,844 | 7/07 | Hemmings | 151—30 |
| 894,693 | 7/08 | Parkhurst | 151—3 |
| 2,207,121 | 7/40 | Hall | 151—30 |
| 2,294,057 | 8/42 | Thompson | 151—14 |

CARL W. TOMLIN, *Primary Examiner.*

EDWARD C. ALLEN, *Examiner.*